No. 743,531. PATENTED NOV. 10, 1903.
J. MAHON.
DEVICE FOR MEASURING BOARDS.
APPLICATION FILED MAY 12, 1903.
NO MODEL.
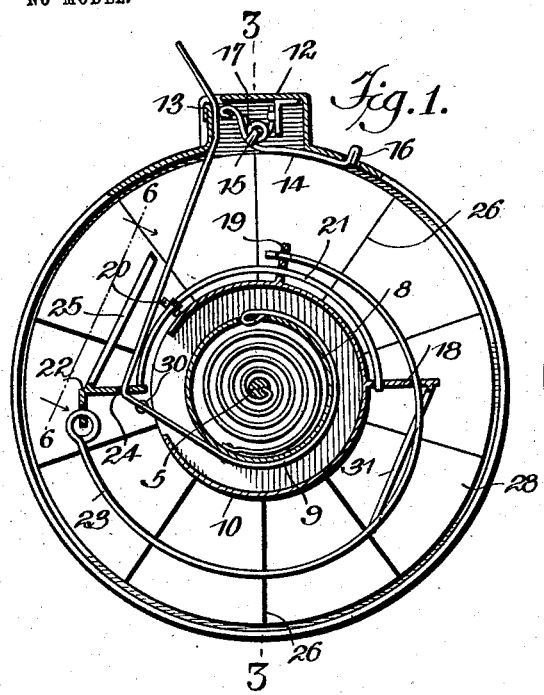
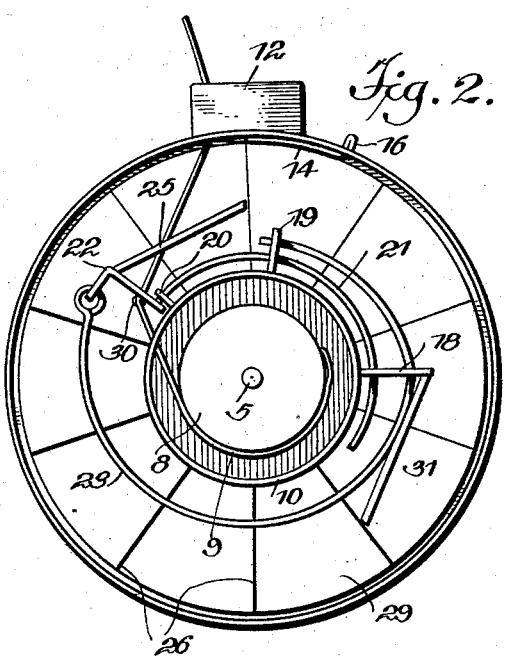
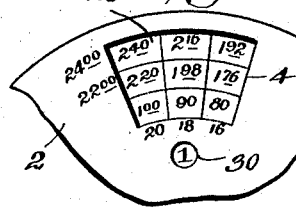
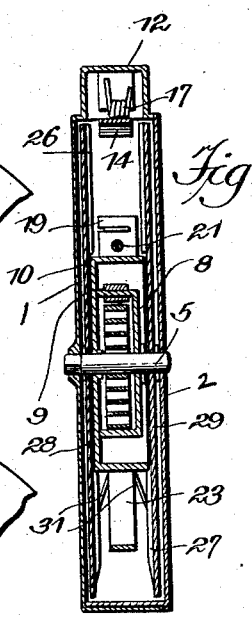
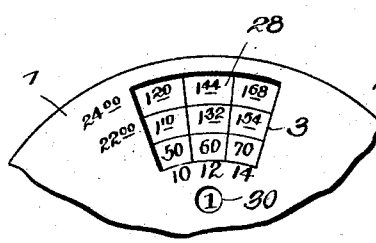
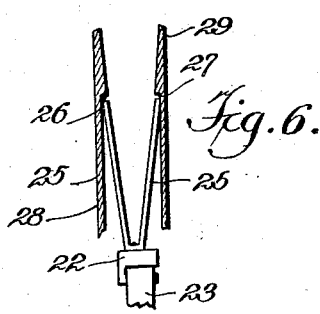
John Mahon, Inventor,
by C. A. Snow & Co.
Attorneys
Witnesses No. 743,531. Patented November 10, 1903.

UNITED STATES PATENT OFFICE.

JOHN MAHON, OF LANGDON, NORTH DAKOTA.

DEVICE FOR MEASURING BOARDS.

SPECIFICATION forming part of Letters Patent No. 743,531, dated November 10, 1903.

Application filed May 12, 1903. Serial No. 156,833. (No model.)

*To all whom it may concern:*

Be it known that I, JOHN MAHON, a citizen of the United States, residing at Langdon, in the county of Cavalier and State of North Dakota, have invented a new and useful Device for Measuring Boards, of which the following is a specification.

This invention relates to certain improvements in measuring and calculating devices, and especially to devices of that class employed in measuring and calculating the price of lumber.

The principal object of the invention is to provide a device for correctly determining the price of small or large quantities of boards, the device being so arranged as to at once indicate the price of the boards measured.

A further object of the invention is to provide a device of this character in which by the employment of a suitable number of computing-tables the value of measured boards of given length may be indicated by a single instrument.

A still further object of the invention is to provide a device of this character in which provision is made for holding a spring-returned tape-line to its position outside the casing until the measurement of a given quantity of boards has been completed.

With these and other objects in view the invention consists in the novel construction and arrangement of parts hereinafter described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is a sectional elevation of a measuring device constructed in accordance with the invention. Fig. 2 is a similar view illustrating some of the parts in different position. Fig. 3 is a transverse sectional elevation of the device on the line 3 3 of Fig. 1. Figs. 4 and 5 are views of portions of the opposite sides of the casing. Fig. 6 is a detail sectional view showing the two disks and the pawl for operating the same.

Similar numerals of reference are employed to indicate corresponding parts throughout the several figures of the drawings.

The device forming the subject of the present invention is intended more especially for measuring the width of boards of a known length—such as the commercial length of ten, twelve, fourteen, sixteen, eighteen, and twenty foot boards—and as the length is known it is merely necessary to measure the width in order to ascertain the whole area, and this area is indicated on a table carried by the instrument, the quantity-indicating mark and a corresponding price-indicating mark being brought into proper relation with marks designating, respectively, the given lengths of board and the price of such board per thousand feet, so that no mental or other calculation is necessary to determine the value of the boards measured.

The measuring apparatus is contained within a suitable casing formed of two interfitting flanged disks 1 and 2, which may be readily separated from each other should it become necessary to make examination or repair any of the parts. The disks are provided with substantially segmental openings 3 and 4, respectively, these openings being disposed in transverse alinement with each other, and at points adjacent to the inner wall of each opening or that wall nearest the center of the casing are suitable indicating-marks designating the lengths of the boards or other articles being measured, and for convenience the numerals "10," "12," and "14" are arranged adjacent to the opening 3 and the numerals "16," "18," and "20" are arranged in reverse order adjacent to the opening 4, these numerals designating commercial lengths of board in feet. There is also provided opposite both openings 3 and 4 price-marks indicating the value of the boards per thousand feet, in the present instance "22" and "24" being employed to indicate values of twenty-two and twenty-four dollars, respectively, for each thousand feet of lumber. The disks 1 and 2 are each provided with a central opening for the passage of a spindle 5, one or both of the openings being non-circular in form and serving to receive the corresponding end of the spindle in order that the latter may be held stationary in the casing. On this spindle is mounted a spring-barrel 8, carrying a small spiral spring having its inner end secured to the spindle and its outer end to the barrel. To the periphery of the barrel, which forms a winding-spool, is secured the inner end of a measuring-tape 9, formed of steel or flexible material of any desired character and divided in the usual manner into inches and corresponding fractional divisions.

The spring-barrel is inclosed within an inner casing 10, having a circular side portion rigidly secured to the stationary spindle, and the annular flange, which forms the circular wall of said casing, being provided with a suitable opening to permit the passage of the tape 9, the tape passing out to the outside of the main casing and arranged in such manner that it may be freely withdrawn during the measuring operation, the pulling of the tape from the casing effecting the winding of the spring and the returning movement of the latter serving to wind up the tape on the spring barrel or spool when the tape is released.

On the periphery of the main case is a small rectangular box or auxiliary casing 12, through which the measuring-tape extends, being guided over the rounded upper end of a spring-arm 13. The tape passes out between the arm 13 and a spring-pressed lever 14, which, with the arm 13, forms a clamp for holding the tape from returning movement. The arm 14 is pivoted on a transversely-disposed pin 15, and its rear end follows the inner wall of the periphery of the casing and thence is bent readily and extends out through a suitable opening in the periphery of the casing, forming a thumb or finger piece 16, which may be depressed to move the arm 14 from engagement with the tape. On the pivot-pin is mounted a small torsion-spring 17, having one end fixed and the other end bearing against the spring-arm in order to maintain the latter in engagement with the tape-line. This construction is such as to permit the more ready measurement of the material, inasmuch as the line cannot return to its winding barrel or spool until the thumbpiece is depressed and the tape released.

Projecting rearwardly from the periphery of the fixed inner casing 10 are three lugs 18, 19, and 20, in which are formed openings for the reception and support of a semicircular bar 21, which is freely movable in a circular path concentric with the inner casing.

To one end of the bar 21 is secured a rearwardly-projecting plate 22, to which is secured one end of a spring 23, the opposite end of which after passing through a guiding-slot in the lug 18 is firmly secured to the intermediate lug 19, carried by the inner casing, the spring normally tending to keep the bar in the position illustrated in Fig. 1 and excessive movement under the influence of the spring being prevented by a collar or stop carried by the bar and engaging against the lug 20. The plate 22 is provided with an opening 24, through which the tape passes after leaving the inner casing, and on said plate are secured two spring-pawls 25, adapted to engage with ratchet-teeth 26 and 27, carried, respectively, by disks 28 and 29, the ratchet-teeth being preferably formed by rearwardly-disposed shoulders formed on the inner surfaces of said disks. On the tape is a projecting finger, collar, or enlargement 30, placed at a given point in the length of the tape, in the present instance at the five-foot mark or at a point beyond the five-foot mark, so that when five feet of the tape have been withdrawn from the casing for measuring purposes this finger will come into contact with the plate 22 and cause an angular movement of the pawls, the latter engaging the ratchet-teeth of the disks 28 and 29 and effecting a movement of said disks for a corresponding angular distance, in the present instance one-tenth of a revolution. To prevent returning movement of the disks after the release of the pawls, the lug 18 is provided with spring locking-pawls 31, which engage the ratchet-teeth and maintain the disks in the positions to which they are adjusted, while the spring 23 returns the actuating-pawls to initial position when tension on the tape is released.

The disk 28 is designed for the measurement of boards in ten, twelve, and fourteen foot lengths and acts in conjunction with the indicating-marks on the member 1 of the casing to designate the quantity of lumber measured and the value of such lumber, while the disk 29 serves to indicate the quantity and value of boards in sixteen, eighteen, and twenty foot lengths.

As each of the disks is provided with ten ratchet-teeth or shoulders, each disk is divided into ten main indicating-spaces, the divisional lines of which are radial, and each of such spaces is of an area equal to that of the opening formed in the casing member through which the computing-tables carried by the disks are displayed. Each of the indicating-spaces is divided by concentric lines into three main divisions indicating, respectively, from the inner to the outer space the quantity of boards measured, the value of board at the rate of twenty-two dollars per thousand, and the value of board at the rate of twenty-four dollars per thousand, while each of the main spaces is further divided by radiating lines into three radial rows, which are brought into alinement with the marks on the casing members indicating known lengths of boards.

Taking disk 28 as an example, one of the main spaces is shown as displayed through the substantially segmental opening in the casing member 1, and the numerals "50," "60," and "70" are shown in radial alinement with the length-designating numerals "10," "12," and "14," the numeral "50" showing that there has been measured five feet in width of boards ten feet long, which at a value of twenty-two dollars per thousand will be worth one dollar and ten cents, while at a value of twenty-four dollars per thousand will be worth one dollar and twenty cents, and in corresponding manner if the boards measured fourteen feet in length there would be indicated an area of seventy feet, worth one dollar and fifty-four cents at a value of twenty-two dollars per thousand or one dollar and sixty-eight cents at a value of twenty-four dollars per thousand, and it is obvious that the number of value-manipulating lugs may be increased to any desired extent in order to indicate different values per thousand for boards of different thickness or of different quality.

To use the device on boards of any known length, the operator starts to measure the width of the boards, and if the first is six inches the tape is left after the first measurement at the numeral "6," and thence the measuring proceeds, so that if the following board is eight inches in width there will be indicated a total of fourteen inches, and so on, increasing up to a width-measure of five feet, the finger or enlargement on the tape-measure coming into contact with the opening in the plate 22 and effecting an angular movement of the pawls, the latter engaging the two calculating-disks and moving the same until the next spaces of the disks are opposite the display-openings. After a width of five feet has been measured the tape is allowed to return to its position by releasing the spring holding-clamp 14, and a second width of five feet may then be measured, the constantly-increasing totals being displayed on the main indicating-spaces at the openings in the casing.

It will be, of course, understood that the length of tape measured before returning to the casing may be increased or diminished to any desired extent or in accordance with the general class of work on which the device is used, and it will further be understood that the number of value-indicating tables may be increased or diminished and that the length-indicating tables may be correspondingly modified to suit various requirements, as in the measurement of timber or other articles of any character.

In practice it is preferred to provide the opposite side of the casing with openings 30 adjacent to the segmental openings 4 and to provide the disks with spaced numerals, which are successively exposed through the openings in order to indicate the number of times the tape is unwound.

Having thus described the invention, what is claimed is—

1. In a device of the class specified, a measuring-tape, a casing having display-openings, length and rate scales carried by the casing adjacent to the display-openings, a disk disposed within the casing and bearing tables indicating total measurements and total values, said disk receiving a step-by-step rotative movement to display successive tables at the openings, and means operable on the withdrawal of the tape for a fixed predetermined distance to effect a single registering movement of the disk, substantially as specified.

2. In a device of the class specified, a measuring-tape, a casing therefor, an indicating-disk, means for operating the same, and a projection carried by the tape for engaging said operating means and registering on the disk the number of times the tape is withdrawn from the casing.

3. In a device of the class specified, comprising a measuring-tape, a disk bearing tables indicating totals and values, length and rate indicating marks carried by the casing and registering with the disk-tables, and means carried by the tape for effecting a registering movement of the disk after a predetermined length of tape has been withdrawn from the casing.

4. In a device of the class described, a casing having a display-opening and provided with length and rate indicating marks adjacent to the opening, a disk having indicating-spaces movable successively into alinement with the display-opening, said indicating-spaces being provided with data designating totals and values, and a measuring-tape having means operable on each withdrawal of the tape for effecting a movement of the disk to the extent of one of such spaces.

5. In a device of the class specified, a casing having a display-opening and provided with indicating-marks designating different rates and different length-measures, a disk having indicating-spaces movable successively into alinement with the display-opening, each of said indicating-spaces being subdivided and bearing data designating different total measurements and different measures of value, and a measuring-tape having means operable on each withdrawal of the tape for moving the disk to the extent of a single indicating-space.

6. In a device of the class specified, a casing, a measuring-tape, a spring-barrel disposed within the casing and serving as a winding-spool for the tape, an indicating-disk having ratchet-teeth and bearing total-indicating tables, a pawl for engaging the ratchet-teeth and moving the disk, and means carried by the tape for effecting operative movement of the pawl.

7. In device of the class specified, a casing having a display-opening, a spring-barrel disposed within the casing, a measuring-tape on the barrel, an indicating-disk having ratchet-teeth, a pawl for engaging the teeth and moving the same on each withdrawal of the tape.

8. In a device of the class specified, a casing having a display-opening, a spring-barrel within the casing, a measuring-tape wound on the barrel, a concentrically-guided bar, a pawl carried thereby, a finger or projection on the tape for engaging and moving the pawl, and a ratchet-disk engaged by the pawl and bearing indicating-tables.

9. In a device of the class described, a casing, a spring-barrel arranged within the casing, a measuring-tape wound on the spring-barrel, an indicating-disk having ratchet-teeth, and a pawl operable on the withdrawal of the tape to engage the ratchet-teeth and effect movement of the indicating-disk.

10. In a device of the class specified, a casing, a spring-barrel, a measuring-tape wound on the barrel and provided with a finger or projection, a curved bar movable circumferentially of the barrel, a slotted plate carried by the bar and through which the tape passes, a pawl carried by the plate, and an indicating-disk having ratchet-teeth engaged by said pawl.

11. In a device of the class specified, the combination with a casing, a spring-barrel, a measuring-tape wound thereon and having a finger or projection, an inner casing surrounding the spring-barrel, a plurality of radially-disposed lugs carried by the inner casing and having guiding-openings, a curved bar adapted to said bearing-openings, a plate carried by the bar and slotted to receive the tape, a pair of spring-pawls carried by the plate, a spring carried by the lugs and serving to return the pawl and bar to initial position after each operative movement, and a pair of indicating-disks adapted to be engaged by the pawls, substantially as specified.

In testimony that I claim the foregoing as my own I have hereto affixed my signature in the presence of two witnesses.

JOHN MAHON.

Witnesses:
J. G. DICKSON,
NEIL MCKECHNIE.